(12) United States Patent
Tashiro et al.

(10) Patent No.: US 9,771,939 B2
(45) Date of Patent: Sep. 26, 2017

(54) VARIABLE DISPLACEMENT EXHAUST TURBOCHARGER EQUIPPED WITH VARIABLE NOZZLE MECHANISM

(75) Inventors: Naoto Tashiro, Tokyo (JP); Yasuaki Jinnai, Tokyo (JP); Hiroyuki Arimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 652 days.

(21) Appl. No.: 14/232,509

(22) PCT Filed: Sep. 5, 2012

(86) PCT No.: PCT/JP2012/072581
§ 371 (c)(1),
(2), (4) Date: Feb. 10, 2014

(87) PCT Pub. No.: WO2013/047124
PCT Pub. Date: Apr. 4, 2013

(65) Prior Publication Data
US 2014/0169947 A1    Jun. 19, 2014

(30) Foreign Application Priority Data
Sep. 28, 2011    (JP) ................... 2011-213557

(51) Int. Cl.
*F04D 17/08*    (2006.01)
*F02B 37/24*    (2006.01)
*F01D 17/16*    (2006.01)

(52) U.S. Cl.
CPC ........... *F04D 17/08* (2013.01); *F01D 17/165* (2013.01); *F02B 37/24* (2013.01);
(Continued)

(58) Field of Classification Search
CPC ........ F01D 17/14; F01D 17/16; F01D 17/167; F01D 17/165; F01D 17/143; F02B 37/24;
(Continued)

(56) References Cited

U.S. PATENT DOCUMENTS 6,962,481 B2 * 11/2005 Knauer ................. F01D 17/165
    415/160
7,396,204 B2 * 7/2008 Shiraishi ............... F01D 17/165
    29/889.2
(Continued)

FOREIGN PATENT DOCUMENTS

CN    1692214 A    11/2005
CN    1920262 A    2/2007
(Continued)

OTHER PUBLICATIONS

Office Action issued in the corresponding Chinese Application No. 201280034254.4, issued on Jun. 1, 2015, along with an English Translation.
(Continued)

*Primary Examiner* — Gregory Anderson
*Assistant Examiner* — Julian Getachew
(74) *Attorney, Agent, or Firm* — Birch, Stewart, Kolasch & Birch, LLP (57) ABSTRACT

It is intended to achieve weight reduction and production reduction of a nozzle mount for pivotably supporting a drive ring constituting a variable nozzle mechanism, and is characterized by: providing on an end face of a guide part 5a a nail pin 20 having a flange portion and being positioned so as to hold a drive ring 3 of a variable nozzle mechanism 100 to the guide part 5a of a nozzle mount 5 in the thrust direction, and setting the thrust-directional width of the drive ring 3 smaller than the width of the guide part 5a, and providing an adjusting member 20c between the flange
(Continued)

portion of the nail pin 20 and the end face of the guide part 5*a* to adjust a distance between the side face of the nozzle mount and the flange portion of the nail pin 20.

3 Claims, 7 Drawing Sheets

(52) U.S. Cl.
 CPC ...... *F05D 2220/40* (2013.01); *F05D 2230/64* (2013.01); *Y02T 10/144* (2013.01)

(58) Field of Classification Search
 CPC .. F02B 37/00; F02B 37/22; F02C 6/12; F04D 17/08; F04D 27/002; F05D 2220/40; F05D 2230/64
 See application file for complete search history.

(56) References Cited

U.S. PATENT DOCUMENTS

| | | | |
|---|---|---|---|
| 7,670,107 B2* | 3/2010 | Barthelet | F01D 17/165 29/889.2 |
| 2010/0202874 A1* | 8/2010 | Hayashi | F01D 17/165 415/160 |

FOREIGN PATENT DOCUMENTS

| | | |
|---|---|---|
| EP | 1120547 A2 | 8/2001 |
| JP | 2005-207373 A | 8/2005 |
| JP | 2006-514191 A | 4/2006 |
| JP | 2010-19252 A | 1/2010 |
| JP | 4545068 B2 | 9/2010 |
| WO | WO 2004/035991 A2 | 4/2004 |

OTHER PUBLICATIONS

International Preliminary Report on Patentability for PCT/JP2012/072581 dated Apr. 10, 2014 with an English Translation.
International Search Report for PCT/JP2012/072581 dated Sep. 5, 2012.
Japanese Notice of Allowance dated Oct. 2, 2012 for related JP Application No. 2011-213557 with English Translation.
Extended European Search Report, issued May 4, 2015, for European Application No. 12836024.5.
European Notice of Allowance, dated Jul. 21, 2016, for European Application No. 12836024.5.
Notice of Allowance issued Aug. 5, 2016 in the corresponding Application No. 201280034254.4 with an English Translation.

* cited by examiner

VARIABLE DISPLACEMENT EXHAUST TURBOCHARGER EQUIPPED WITH VARIABLE NOZZLE MECHANISM

TECHNICAL FIELD

The present invention relates to a structure for retaining a drive ring rotatable with respect to a nozzle mount in a variable displacement exhaust turbocharger, which is used for an exhaust turbocharger of an internal combustion engine and which is equipped with a variable nozzle mechanism for varying a vane angle of a plurality of nozzle vanes.

BACKGROUND ART

As one variable displacement exhaust turbocharger which is used for an exhaust turbocharger of an internal combustion engine and which is equipped with a variable nozzle mechanism for varying a vane angle of a plurality of nozzle vanes, the technique of JP 2010-19252 (Patent Document 1) is provided.

Figure 6A:
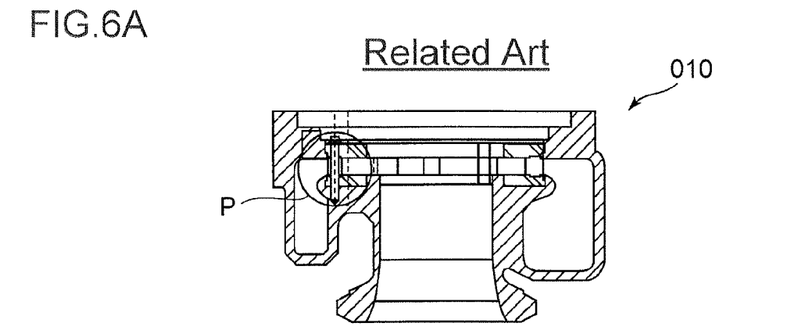
FIG. 6A illustrates a turbine housing 010 of the related art.
Figure 6B:
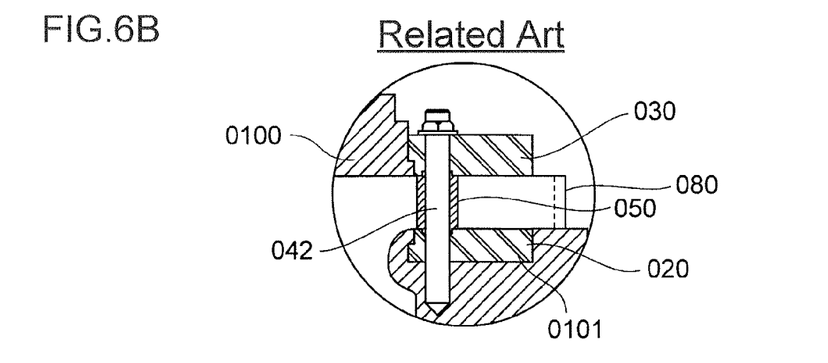
FIG. 6B is a partial enlarged view of section P of FIG. 6A.
Figure 6C:
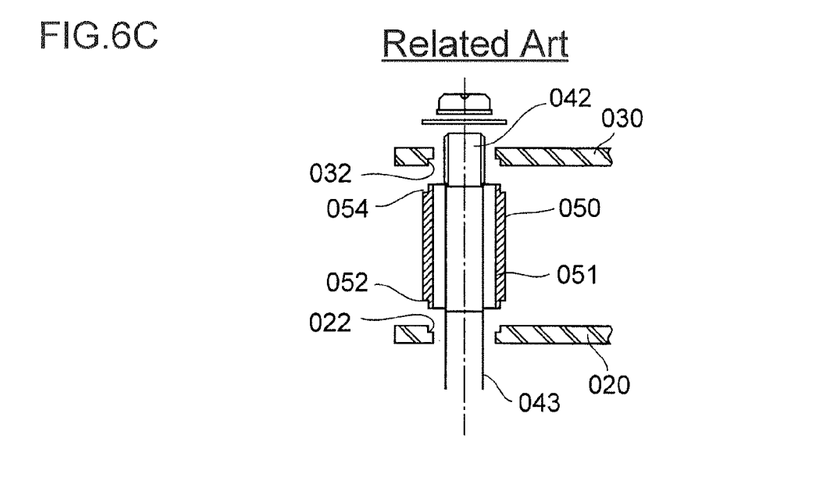
FIG. 6C is an exploded view of components of FIG. 6B.

This technique of the related art is illustrated in the attached drawings. FIG. 6A is an illustration of a turbine housing 010. FIG. 6B is a partial enlarged view of section P of FIG. 6A. FIG. 6C is an exploded view of components of FIG. 6B.

A variable nozzle mechanism 0100 is configured such that a plurality of guide vanes (nozzle vanes) 080 is positioned between a lower vane ring 020 and an upper vane ring 030. The guide vane 080 is rotatably supported about an axis to control a flow rate of exhaust gas flowing in a turbine. The distance between the lower vane ring 020 and the upper vane ring 030 is maintained by a stepped spacer 050 which is positioned therebetween. The upper vane ring 030 and the lower vane ring 020 are attached to the turbine housing 010 by nuts 040 and metal fastening members 042.

Further, the stepped spacer 050 has a through-hole formed in the center so that the fastening member 042 can pass through the stepped spacer 050.

Meanwhile, another technique is disclosed in JP 4545068B (Patent Document 2). A variable displacement exhaust turbocharger of JP 4545068B is configured, as illustrated in FIG. 7, such that a drive ring 064 is arranged on a peripheral circumferential surface of a guide part 057 of a nozzle mount 055 to be disposed between a side face of a lever plate (not shown, disposed on a left side of the drive ring 064) and a side face of the nozzle mount 055 so that they are next to each other in the axial direction and a stud with a flange (a nail pin) 066 is fixed to a side part of the nozzle mount 055 to be in contact with an outer surface 064*a* of the drive ring 064 so as to prevent the drive ring 064 from moving in the axial direction, i.e. coming off toward the lever plate side.

Figure 7:
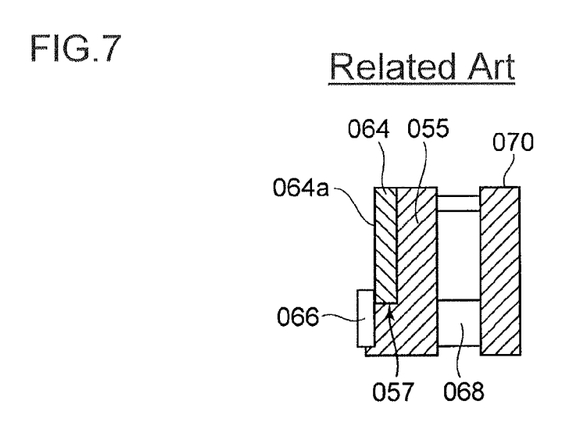
FIG. 7 is an illustration of the related art.

In FIG. 7, a nozzle vane 068 is provided between the nozzle mount 055 and an annular support plate 070.

CITATION DOCUMENT

Patent Document

[Patent Document 1]
JP 2010-095252 A
[Patent Document 2]
JP 4545068 B (FIG. 3)

SUMMARY

Technical Problem

However, the stepped spacer 050 described in Patent Literature 1 has the central through-hole for the fastening member 042 to pass through. Further, this stepped space 050 is provided to maintain the distance between the lower vane ring 020 and the upper vane ring 030 where the plurality of guide vanes (nozzle vanes) 080 is arranged.

Patent Document 1 teaches to use the stepped spacer 050 for positioning. However, there is no disclosure as to the use of the stepped spacer 050 for positioning of the drive ring in a thrust direction by fitting the drive ring for varying a vane angle of the nozzle vane to the guide part of the nozzle mount.

In the fixing mechanism of Patent Document 2 using the nail pin 066 capable of abutting to the outer surface 064*a* of the drive ring 064, the guide part 057 of the nozzle mount 055 is required to have a space to accommodate a mounting width of the drive ring 064. Correspondingly, the nozzle mount 055 is required to have a significant width in the axial direction of the nozzle mount 055. It results in increase of the nozzle mount 055 in size and weight, and this also makes it difficult to manufacture the nozzle mount 055 by press-molding. Moreover, as the width dimension of the guide part 057 of the nozzle mount 055 needs to be machined with high precision in relation to the width dimension of the drive ring 064, and this causes an increase in the number of the processing steps.

In view of the above issues, it is an object of the present invention to reduce the weight and production cost of a nozzle mount by pres-fitting a pin with a flange portion into a press-fitting hole formed in an end face of a guide part along a thrust direction so as to retain the drive ring to the guide part of the nozzle mount in the thrust direction and providing an adjusting member (a spacer member) between the flange portion and the end face for adjustment in the thrust direction.

Solution to Problem

To solve the above issues, the present invention provides a variable displacement exhaust turbocharger which is equipped with a variable nozzle mechanism and is driven by exhaust gas from an engine, and the variable displacement exhaust turbocharger comprises:

a plurality of nozzle vanes supported rotatably by a nozzle mount which is fixed to a case including a turbine casing of the variable displacement exhaust turbocharger;

a drive ring which is interlocked with an actuator and is fitted to an annular guide part protruding from a center part of the nozzle mount in an axial direction, the guide part having a width in a thrust direction which is smaller than a width of the drive ring;

a plurality of lever plates each of which is fitted to a groove formed in the drive ring at one end via a connection pin and is connected to the nozzle vane at the other end;

a press-fitting pin which has a flange portion facing a side face of the drive ring, the press-fitting pin being press-fitted into a press-fitting hole formed in an end face of the guide part along a thrust direction of the guide part so as to retain the drive ring in the thrust direction; and an adjusting member arranged between the flange portion of the press-fitting pin and the end face of the guide part, wherein the adjusting member is configured to adjust a distance between the flange portion of the press-fitting pin and a side face of the nozzle mount, the drive ring being sandwiched between the flange portion and the side face of the nozzle mount.

According to the present invention, by reducing the thrust-directional thickness of the guide part of the nozzle mount and providing the adjusting member for adjustment in the thrust direction between the guide part and the flange portion for restricting rocking of the drive ring in the thrust direction, it is possible to form an appropriate amount of clearance in the thrust direction of the drive ring.

Therefore, as the guide part can be shortened in the thrust direction by the amount equivalent to the thickness of the adjusting member (in the thrust direction of the guide part), it is possible to achieve weight reduction and cost reduction of materials.

Further, by reducing the thrust-directional thickness of the guide part of the nozzle mount, it is possible to reduce the thrust-directional thickness of the nozzle mount including the guide part in the thrust direction. This enables production by press working, thereby reducing the production cost.

In a preferred embodiment of the present invention, the adjusting member comprises the press-fitting pin formed integrally with the flange portion.

By forming the adjusting member integrally with the press-fitting pin, it is possible to simplify the mounting work and production of the adjusting member.

It is also preferable in the present invention that the adjusting member has an annular shape and is formed by a separate member from the press-fitting pin.

With this configuration, the adjusting member can be formed separately, and thus it is possible to precisely process the adjusting member to a desired thickness.

Advantageous Effects

With the configuration that the thrust-directional width of the guide part is made smaller than the width of the drive ring, the adjusting member is sandwiched between the flange portion of the press-fitting pin and the end face of the guide part, the distance between the side face of the nozzle mount supporting the drive ring and the flange portion of the press-fitting pin is adjusted by the adjusting member, an amount of clearance at the guide part in the thrust direction of the drive ring is adjustable using the adjusting member. Thus, compared to the case where the thrust-directional length of the guide part is precisely processed by end mill machining or the like, the production cost can be reduced.

Moreover, as the thrust-directional length of the nozzle mount can be reduced by the amount of the thickness of the adjusting member (in the thrust direction of the guide part), it is possible to achieve the weight reduction and cost reduction of the materials. Further, by reducing the thrust-directional thickness of the guide part of the nozzle mount, it is possible to reduce the thrust-directional thickness of the nozzle mount including the guide part. This enables production by press working, thereby reducing the production cost.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

(First Embodiment)

Figure 1:
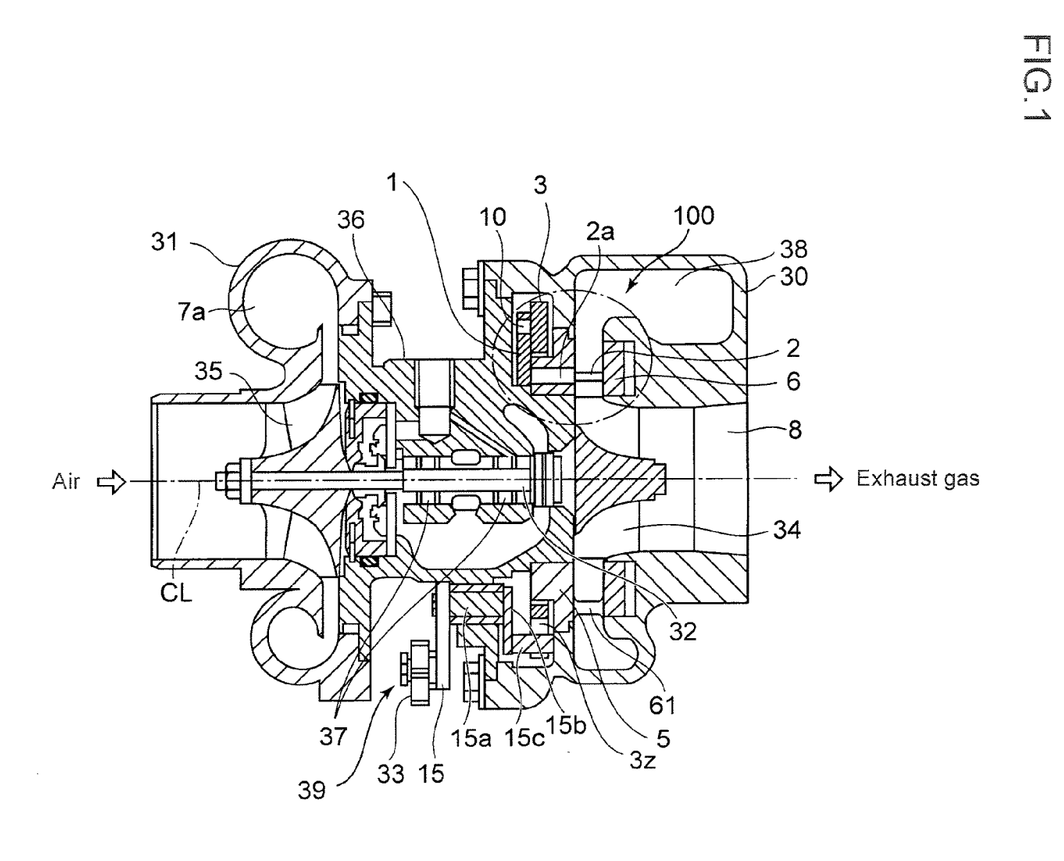
FIG. 1 is a longitudinal cross-sectional view of a main part of a variable displacement exhaust turbocharger equipped with a variable nozzle mechanism according to an embodiment of the present invention.

FIG. 1 is a longitudinal cross-sectional view of a main part of a variable displacement exhaust turbocharger equipped with a variable nozzle mechanism according to an embodiment of the present invention.

FIG. 1 illustrates a turbine casing 30, a scroll 38 of a scroll shape formed in an outer peripheral part of the turbine casing 30, a turbine rotor of a radial flow type 34, a compressor 35, a turbine shaft 32 for connecting the turbine rotor 34 and the compressor 35, a compressor housing 31 and a bearing housing 36.

The turbine shaft 32 connecting the turbine rotor 34 and the compressor 35 is rotatably supported by the bearing housing 36 via two bearings 37, 37. The drawing also illustrates an exhaust gas outlet 8 and a rotation axis CL of the exhaust turbocharger.

A plurality of nozzle vanes 2 is arranged on an inner circumferential side of the scroll 38 at equal intervals in the circumferential direction of a turbine and is supported rotatably by a nozzle mount 5. A nozzle shaft 2a is formed on a vane end of the nozzle vane 2 and is rotatably supported by the nozzle mount 5 which is fixed to the turbine casing 30.

On an opposite side of the nozzle shaft 2a from the vane end, a lever plate 1 for varying a vane angle of the nozzle vane 2 by rotation of the nozzle shaft 2a is connected to the drive ring 3 via a connecting pin 10.

An actuator rod 33 is configured to transmit a reciprocating motion from an actuator (not shown). A drive mechanism 39 is configured to convert the reciprocating motion of the actuator rod 33 (a reciprocating motion in a direction substantially perpendicular to the drawing) into a rotational motion by a rotation shaft 15a, and rotate the drive ring 3 by a drive pin 15c disposed at an end of a lever 15b fixed to the rotation shaft 15a.

A section 100 surrounded by a dotted line is a part of a variable nozzle mechanism for varying a vane angle of the nozzle vane 2.

In the operation of the variable displacement exhaust turbocharger equipped with the variable nozzle mechanism which is configured as illustrated in FIG. 1, exhaust gas from an internal combustion engine (not shown) enters the scroll 38 and flows into the nozzle vanes 2 while swirling along the scroll shape of the scroll 38. After flowing past between the nozzle vanes, the exhaust gas flows in the turbine rotor 34 from its outer peripheral side. Then, the exhaust gas flows radially toward the center to perform expansion work in the turbine rotor 34. After performing the expansion work, the exhaust gas flows out in the axial direction and then guided toward the exhaust gas outlet 8 and sent outside of the turbine rotor 34.

In order to control the displacement of this variable displacement turbine, a vane angle of the nozzle vanes 2 at which a flow rate of the exhaust gas through the nozzle vanes 2a reaches a desired flow rate is set by a vane angle controller (not shown) with respect to the actuator. The reciprocal displacement of the actuator with respect to this vane angle is transmitted to the drive ring 3 via the drive mechanism 39 so as to drive and rotate the drive ring 3.

By rotation of the drive ring 3, the lever plate 1 is caused to rotate around the nozzle shaft 2a via a connection pin 19 which is described later. By rotation of the nozzle shaft 2a, the nozzle vane 2 is rotated to the vane angle which is set as to the actuator.

Figure 2A:
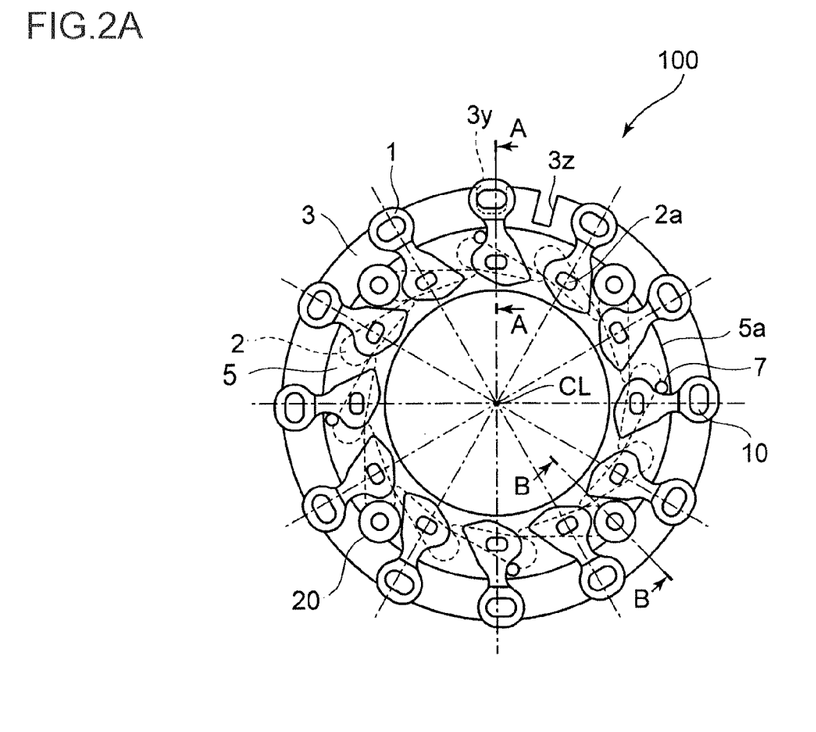
FIG. 2A is a front view of a variable nozzle mechanism according to a first embodiment of the present invention, which is taken from a lever plate side.
Figure 2B:
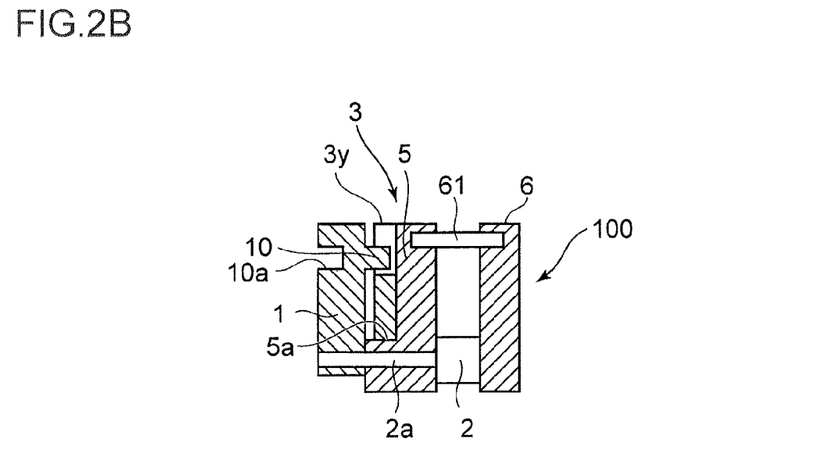
FIG. 2B is a cross-sectional view in A-A of FIG. 2A.

FIG. 2A is a front view of the variable nozzle mechanism, which is taken from the lever plate 1 side. FIG. 2B is a cross-sectional view in A-A of FIG. 2A. The drawings illustrate a variable nozzle mechanism 100 for varying the vane angle of the nozzle vanes 2. The variable nozzle mechanism 100 is configured as described below.

The drive ring 3 formed in a disk shape is externally fitted to a guide part 5a (see FIG. 2B) of a cylinder shape which protrudes in the direction of the axis CL of the nozzle mount 5 (in the same direction as the rotation axis of the exhaust turbocharger) to be rotatably supported. Further, grooves 3y, with which the connection pins 10 engage, are formed in drive ring 3 at equal intervals in the circumferential direction. The grooves 3y are described later. The drive mechanism 39 has a drive groove 3z where the actuator rod 33 engages.

The same number of the lever plates 1 as the grooves 3y of the drive ring 3 is provided at equal intervals in the circumferential direction. On the outer peripheral side of each of the lever plates 1, the connection pin 10 is formed. On the inner peripheral side of each of the lever plates 1, the nozzle shaft 2a of the nozzle vane 2 is fixed.

A nozzle plate 6 of an annular shape is connected to the nozzle mount 5 by a plurality of nozzle supports 61.

In the variable nozzle mechanism, as illustrated in FIG. 2B, the lever plate 1 is arranged on an inner side in the axial direction (on the compressor housing 31 side in FIG. 1), and between a side face of the lever plate 1 and a side face of the nozzle mount 5, the drive ring 3 is arranged in the state where the drive ring 3, the lever plate 1 and the nozzle mount 5 are arranged next to one another in the axial direction.

The connection pin 10 is formed integrally with a base material by pressurizing one side face of each of the lever plates 1 by a press machine so that a rectangular depression 10a is formed on the side face and a rectangular protrusion is formed on the other side face by extrusion.

The drive ring 3 of the variable nozzle mechanism 100 which is formed in the above manner, needs to be retained with respective appropriate clearances between the nozzle mount 5 and the flange portion 20a of the nail pin 20, and between the inner peripheral surface of the drive ring 3 and the outer peripheral surface of the guide part 5a.

If the clearance is greater than a specified value, the drive ring 3 rocks in the axial direction of the nozzle mount 5. This can result in one-side hitting of a thrust-direction end of a sliding face of the drive ring 3 against the guide part (one-side contact), which causes fixation.

On the other hand, if the clearance is smaller than the specified value, the sliding resistance of the nozzle mount 5 increases, which causes fixation of the sliding portion.

To prevent the fixation, it is desired to ensure an appropriate amount of a thrust-directional clearance L8 (see FIG. 3B) in the thrust direction of the nozzle mount 5 and the drive ring 3. To maintain the appropriate amount of clearance L8, a nail pin 20 which is a pin with a flange portion 20a is press-fitted in the press-fitting hole 5b formed at an outer peripheral edge part of the end face of the guide part 5a in the thrust direction, so as to secure an appropriate clearance by means of the flange.

Figure 3A:
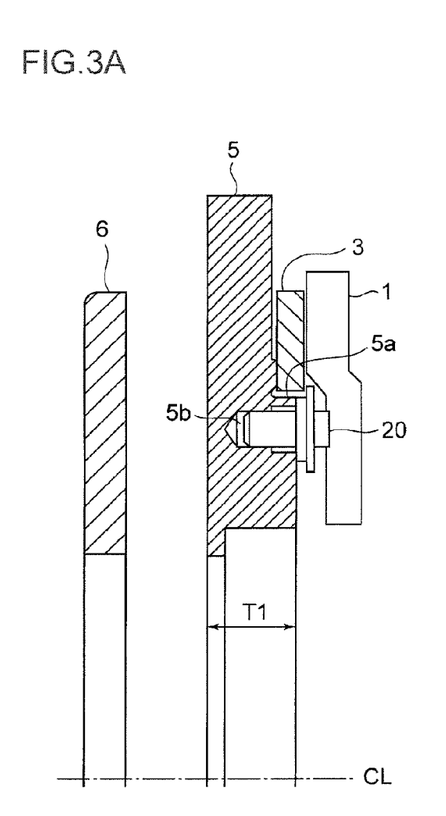
FIG. 3A is an enlarged cross-sectional view of a part where a nail pin is press-fitted in a nozzle mount according to a first embodiment of the present invention, which is taken in B-B of FIG. 2A.
Figure 3B:
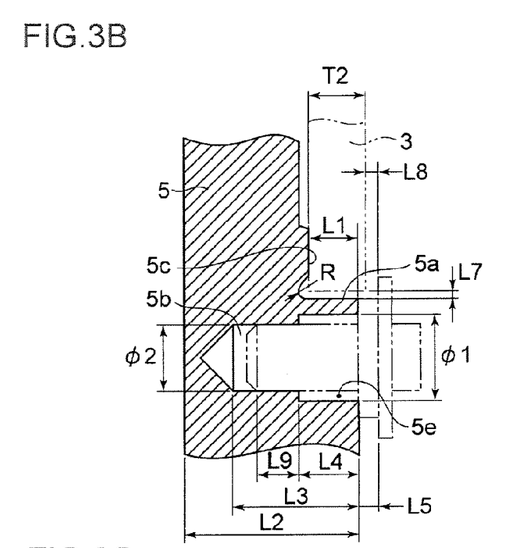
FIG. 3B is an enlarged view of a press-fitting hole on a nozzle mount side according to the first embodiment of the present invention.
Figure 3C:
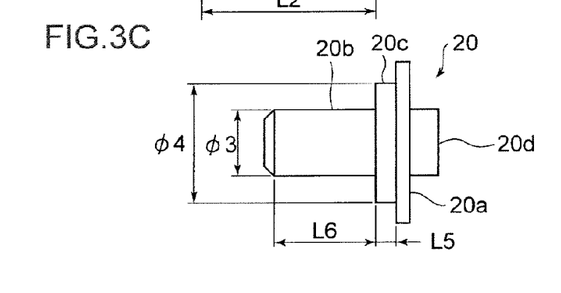
FIG. 3C is a schematic view of the nail pin according to the first embodiment of the present invention.

FIG. 3A is an enlarged cross-sectional view of a part where a nail pin serving as the press-fitting pin is press-fitted in the nozzle mount 5 according to a first embodiment of the present invention, which is taken in B-B of FIG. 2A. FIG. 3B is an enlarged view of a press-fitting hole on the nozzle mount. FIG. 3C is a schematic view of the nail pin to be press-inserted in the press-fitting hole of FIG. 3B.

At the end face of the guide part 5a, a nail pin 20 with a flange portion 20a is press-fitted in a press-fitting hole 5b. The nail pin 20 has the flange portion 20a to prevent rocking of the drive ring 3 in the direction of the axis CL of the nozzle mount 5 during rotation of the drive ring 3.

In FIG. 3A, the disc-shaped drive ring 3 is externally fitted to the cylindrical guide part 5a protruding in the direction of the axis CL of the nozzle mount 5 such that there is a small clearance L7 therebetween in the radial direction.

The length L1 of the guide part 5a (a protrusion amount) is set smaller than a thickness T2 of the drive ring 3 which is externally fitted to the nozzle mount 5 such that the drive ring 3 contacts a section of the nozzle mount 5 disposed between a contact portion 5c where the drive ring 3 contacts and the end face of the guide part 5a.

A thickness T1 of the nozzle mount 5 (in the thrust direction) is set to the maximum length that can be machined by press so as to reduce the process cost and weight of the nozzle mount 5.

As for the thickness T1 of the nozzle mount 5, the press-machining precision is improved, whereby maintaining a fixed strength and a perpendicularity of a stopper pin (not shown) for restricting a swing amount of the lever plate 1 which swings to define a fully-closed position of the vane angle of the nozzle vane 2 and the nail pin which is press-fitted in the nozzle mount 5.

FIG. 3B is a detailed view of the press-fitting hole 5b. FIG. 3C is an illustration of the nail pin 20 to be press-fitted in the press-fitting hole 5b.

The press-fitting hole 5b is formed in the outer peripheral edge part of the end face of the guide part 5a along the axis CL of the nozzle mount 5, and a plurality of the press-fitting holes 5b is arranged at equal intervals in the circumferential direction.

The press-fitting hole 5b changes in hole diameter at two stages along an axis of the hole. Specifically, the hole diameter of the press-fitting hole 5b is ø1 on an opening side (L4 area) where the nail pin 20 is inserted and changes to ø2 on its deeper side (L3-L4 area) to satisfy the relationship of ø1>ø2.

The area of the length L4 of the section with the hole diameter ø1 extends from a deeper side of the contact portion 5c (a position on left side of the contact portion 5c on the drawing) to the end face of the guide part 5a.

The nail pin 20 includes a pin portion 20b to be press-fitted in the press-fitting hole 5b, the flange portion 20a, a stepped portion 20c which is an adjusting member for forming the appropriate clearance L8 between the drive ring 3 and the flange portion 20a, and a protruding portion 20d which protrudes from the flange portion 20a which is opposite from the flange portion 20a.

The nail pin 20 is integrally formed with the stepped portion 20c.

By a thrust-directional thickness L5 of the nail pin 20, the appropriate amount of the clearance L8 is formed.

The hole diameter ø2 is smaller than a diameter ø3 of a tip part of the nail pin 20, and the hole diameter ø2 and the diameter ø3 are formed according to a dimensional relationship of press-fitting. The length L9 of the tip part of the pin 20 (a press-fit margin) which is inserted in the hole diameter ø2 is long enough to possess a fixing strength to prevent the nail pin 20 from coming out from the press-fitting hole 5b easily during the operation of the drive ring 3.

Further, the outer peripheral surface of the outer diameter ø4 of the stepped portion is set so as not to project beyond the outer peripheral surface of the guide part 5a in the radial direction when the nail pin 20 is press-fitted in the press-fitting hole 5b.

The protruding portion 20d is a portion where a press-fitting tool is abutted when press-fitting the nail pin 20 into the press-fitting hole 5b. Without the protruding portion 20d, the pin portion 20b deforms during insertion of the nail pin 20 due to the press-fitting pressure acting on the pin portion 20b. The deformation of the pin portion 20b accompanies deformation of the flange portion 20a. Therefore, the protruding portion 20d is provided to prevent deformation of the nail pin 20 and facilitate assembling thereof.

Further, the height L1 of the guide part 5a and the thickness L5 of the stepped portion 20c are set so that an appropriate clearance L8 is secured between the flange portion 20a of the nail pin 20 and the drive ring 3 when the nail pin 20 is press-fitted into the press-fitting hole 5b.

Furthermore, in a section where the sliding face width (T2) of the drive ring 3 is located, a space 5e is formed in L1 section of the press-fitting hole 5b.

Thus, although a section of the press-fitting hole 5b of the nozzle mount 5 on the drive ring 3 side is thin and has low rigidity, it is possible to prevent outward bulging of the section caused by the press-fitting of the nail pin 20.

This is, however, not restrictive and it is not a problem in this embodiment even if the space 5e is not provided.

A relief R is provided in a continuous portion between the contact portion 5c and the guide part 5a of the nozzle mount 5 so that the edge of the sliding face width (T2) of the drive ring 3 reliably contacts the guide part 5a.

By ensuring that the slide face of the drive ring 3 contacts across the guide part 5a, it is possible to reduce rocking of the drive ring 3 in the thrust direction during rotation of the drive ring 3, thereby preventing the fixation of the edge of the sliding face width of the drive ring and the guide part 5a.

On an outer circumferential side of the relief R of the side face, the contact portion 5c of a disk shape is formed so that the radial-direction side face of the drive ring 3 contacts the disk-shaped contact portion 5c. The contact portion 5c is provided to reduce frictional resistance between the side face of the nozzle mount 5 and the radial-direction side face of the drive ring 3, thereby enhancing smooth rotation of the drive ring 3.

With the above configuration, by press-machining the nozzle mount 5, the length L1 of the guide part 5a of the nozzle mount 5 becomes small and the thrust-directional thickness T1 of the entire nozzle mount 5 is reduced by an amount of the thickness L5 of the stepped portion 20c. Thus, it is possible to achieve the weight reduction and cost reduction of materials.

The configuration of the nozzle mount 5 (the configuration around the guide part) was conventionally complicated and it required many steps to achieve machining precision when machining the guide part 5a in the thrust direction (end mill machining). However, with the integral configuration in which the stepped portion serving as the adjusting member is integrally provided in the nail pin 20, high machining precision can be easily achieved by adopting lathe machining, whereby achieving significant reduction in the machining cost.

Further, as the space 5e is formed in L4 section of the nail pin 20 and the press-fitting hole 5b, press-fitting of the nail pin 20 does not generate a bulging portion on the surface of the guide part 5a in the section where the sliding face T2 of the drive ring 3 is located. Therefore, it is possible to maintain the surface of the guide part 5a smooth and avoid the fixation of the drive ring 3 and the guide part 5a.

In the case where the space 5e is not provided, the fitting dimension of the pin portion 20b and the press-fitting hole 5b in the L4 section may be adjusted to avoid generation of the bulging portion.

Moreover, as the diameter of the press-fitting hole 5b in the L4 section is large, press-fitting work is facilitated.

(Second Embodiment)

A second embodiment will be described in reference to FIG. 4A, FIG. 4B and FIG. 4C.

The structure is the same as the first embodiment, except for press-fitting of a nail pin 21 in the nozzle mount 51. Thus, structures such as the variable nozzle mechanism will not be described further herein.

In addition, for parts of the same shape with the same effect, are assigned the same reference numerals, and a description thereof will be omitted.

Figure 4A:
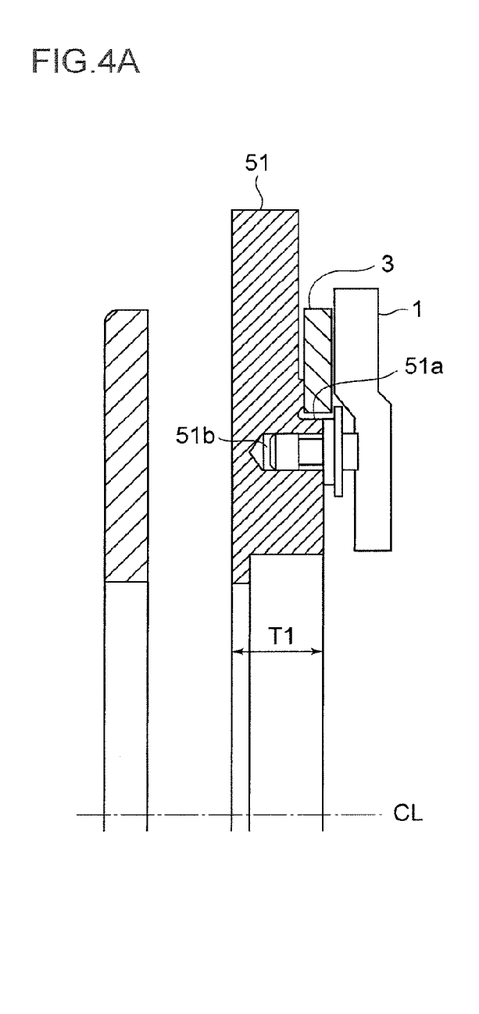
FIG. 4A is an enlarged cross-sectional view of a section where a nail pin according to a second embodiment of the present invention is press-fitted in the nozzle mount.

FIG. 4A is an enlarged cross-sectional view of a section where a nail pin according to the second embodiment of the present invention is press-fitted in the nozzle mount. FIG. 4B is an enlarged view of a press-fitting hole on the nozzle mount side. FIG. 4C is a schematic view of the nail pin to be inserted in the press-fitting hole of FIG. 4B.

FIG. 4A shows a nozzle mount 51 and a lever plate 1. In FIG. 4A, the drive ring 3 is externally fitted to a guide part 51a of the nozzle mount 51.

Figure 4B:
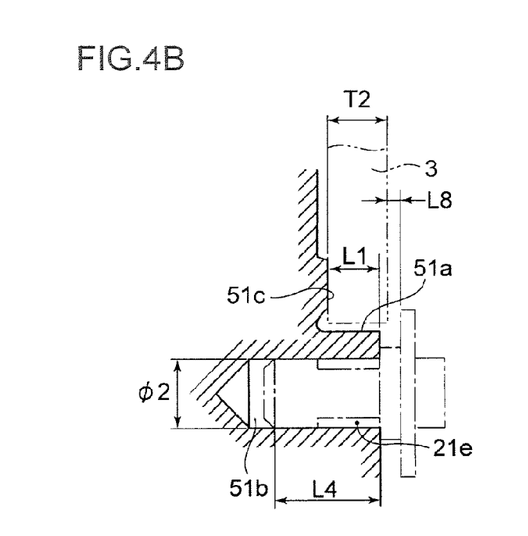
FIG. 4B is an enlarged view of a press-fitting hole on the nozzle mount side according to the second embodiment of the present invention.
Figure 4C:
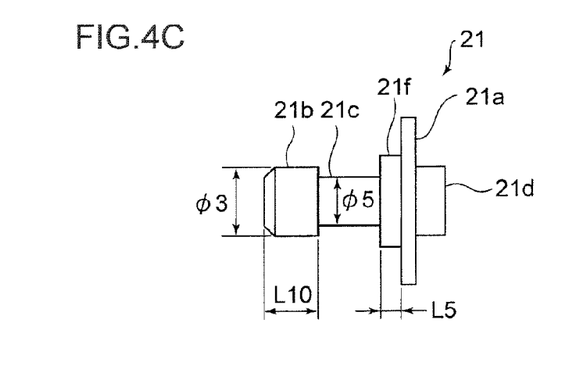
FIG. 4C is a schematic view of the nail pin according to the second embodiment of the present invention.

FIG. 4B illustrates a press-fitting hole 51b where a nail pin 21 is press-fitted. FIG. 4C illustrates the nail pin 21 to be fitted to the press-fitting hole 51b.

The press-fitting hole 51b has a diameter ø2 and is formed in the outer peripheral edge part of the end face of the guide part 51a along the axis CL of the nozzle mount 51, and a plurality of the press-fitting holes 51b is arranged in the outer peripheral edge part at equal intervals in the circumferential direction.

The area of the length L4 of the section with the hole diameter ø2 extends from the end face of the guide part 51a to a deeper side of a contact portion 51c (a position on left side of the contact portion 51c on the drawing).

The length L1 of the guide part 51a (a protrusion amount) is set smaller than an amount equivalent to the thickness T2 of the drive ring 3 which is externally fitted to the nozzle mount 5 such that the drive ring 3 contacts a section of the nozzle mount 51 disposed between the contact portion 51c where the drive ring 3 contacts and the end face of the guide part 5a.

The nail pin 21 comprises a pin tip portion 21b to be press-fitted in the press-fitting hole 51b, a reduced diameter part 21c with smaller diameter than the pin tip portion 21b, a stepped portion 21f which is a disc-shape adjusting member having an outer diameter portion does not project beyond the outer peripheral surface of the guide part 51a in the radial direction, a flange portion 21a for maintaining an appropriate clearance L8 (see FIG. 4B) with respect to the side face of the drive ring 3 and restricting rocking of the side face of the drive ring 3 in the thrust direction, and a protruding portion 21d from the flange portion 21a to a side which is opposite from the stepped portion 21f. The nail pin 21 is integrally formed.

The nail pin 21 to be press-fitted in the press-fitting hole 51b is configured so that the pin tip part 21b has diameter ø3 and the reduced diameter part 21c between the pin tip part 21b and the stepped portion 21f has diameter ø5, and diameter ø3>diameter ø5.

The thrust-directional length L5 of the stepped portion 21f is determined to secure an appropriate clearance L8 between the side face of the drive ring 3 and the flange portion 21a.

A length L10 of the diameter ø3 of the tip part 21b (press-fit margin) has a length that achieves fixing strength so that the nail pin 21 does not come out from the press-fitting hole 51b easily at the operation of the drive ring 3 when inserting the nail pin 21 into the press-fitting hole 51b.

Further, each of the tip part 21b of the nail pin 21 and the press-fitting hole 51b is formed in interference-fitting dimension of a respective elastic deformation region so that the section (L1) of the press-fitting hole 51b opposing the drive ring 3 does not plastically deform when press-fitting the nail pin 21 into the press-fitting hole 51b.

Thus, by press-fitting the nail pin 21 into the press-fitting hole 51b, the stepped portion 21b is abutted to the end face of the guide part 51a to form the appropriate clearance L8.

With this configuration, the thrust-directional thickness T1 of the nozzle mount 51 is reduced by the amount equivalent to the thickness L5 of the stepped portion 21f. Thus, it is possible to achieve the weight reduction and cost reduction of materials.

The configuration of the nozzle mount 51 (the configuration around the guide part) was conventionally complicated and it required many steps to achieve machining precision when machining the guide part 51a in the thrust direction (end mill machining). However, with the integral configuration in which the stepped portion serving as the adjusting member is integrally provided in the nail pin 21, high machining precision can be easily achieved by adopting lathe machining, whereby achieving significant reduction in the machining cost.

Further, as the space 21e is formed in L4 section of the nail pin 20 and the press-fitting hole 5b, press-fitting of the nail pin 21 does not generate a bulging portion on the surface of the guide part 51a in the section where the sliding face T2 of the drive ring 3 is located. Therefore, it is possible to maintain the surface of the guide part 51a smooth and avoid the fixation of the drive ring 3 and the guide part 51a.

(Third Embodiment)

Figure 5:
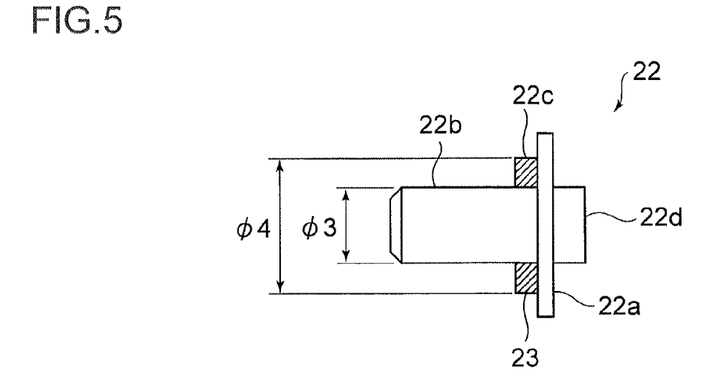
FIG. 5 illustrates a schematic configuration of the nail pin according to a third embodiment.

A third embodiment will be described in reference to FIG. 5.

The structure is the same as the first embodiment, except for a shape of the nail pin. Thus, structures except for the nail pin will not be described further herein.

A nail pin 22 comprises a pin portion 22b to be press-fitted in the press-fitting hole 5b (see FIG. 3B), a flange portion 22a for restricting rocking of the drive ring 3 (see FIG. 3B) in the thrust direction, and a press-fitting tool receiving part 22d where a press-fitting strikes when the nail pin 22 protruding from the flange portion 22a to a side which is opposite from the pin portion 22b is press-fitted into the press-fitting hole 5b. The nail pin 21 is integrally formed.

Moreover, in a section where the pin portion 22b contacts the flange portion 22a, a spacer 23 (corresponding to the stepped portion 20c of the first embodiment) serving as an adjusting member is press-fitted.

The dimension of the spacer 23 is adjusted so that the outer peripheral surface of the space 23 does project beyond the outer peripheral surface of the guide part 5a (see FIG. 3B) when the nail pin 22 is press-fitted in the press-fitting hole 5b.

In this embodiment, the spacer 23 is press-fitted to the nail pin 22. Thus, by eliminating a gap between an inner peripheral surface of the spacer 23 and the pin portion 22b and setting the outer diameter of the spacer 23 to the maximum diameter which is twice as large as the distance between the axis of the press-fitting hole 5b and the outer peripheral surface of the guide part 5a, it is possible to prevent the spacer 23 from projecting beyond the outer peripheral surface of the guide part 5a to secure the clearance L7 (see FIG. 3B) between the inner peripheral surface of the drive ring 3 and the spacer 23, prevent fixation of these parts and also secure the clearance L8 in the thrust direction of the drive ring 3.

In this embodiment, the configuration in which the spacer 23 is press-fitted to the pin portion 22b is described. This is, however, not restrictive, and the spacer 23 may be inserted in a manner other than press-fitting to achieve the same effects as long as, with the clearance between the pin portion 22b and the inner peripheral surface of the spacer 23, even if the spacer 23 is disposed closer to the guide part 5a side when the nail pin 22 is press-fitted in the press-fitting hole 5b, the outer peripheral part of the spacer 23 is either flush with the outer peripheral surface of the guide part 5a or slightly closer to the center of the spacer 23 without projecting beyond the outer peripheral surface of the guide part 5a.

INDUSTRIAL APPLICABILITY

According to the present invention, it is possible to provide a variable displacement exhaust turbocharger equipped with a variable nozzle mechanism for varying a vane angle of a plurality of nozzle vanes, whereby the drive ring of the variable nozzle mechanism is easily retained to the guide part with an appropriate clearance and fixation of the inner peripheral surface of the drive ring and the outer peripheral surface of the guide part is prevented so as to achieve cost reduction and improved durable reliability.

The invention claimed is:

1. A variable displacement exhaust turbocharger which is equipped with a variable nozzle mechanism and is driven by exhaust gas from an engine, the variable displacement exhaust turbocharger comprising:
    a plurality of nozzle vanes supported rotatably by a nozzle mount which is fixed to a case including a turbine casing of the variable displacement exhaust turbocharger;
    a drive ring which is interlocked with an actuator and is fitted to an outer peripheral surface of an annular guide part protruding from a center part of the nozzle mount in an axial direction;
    a plurality of lever plates each of which is fitted to a groove formed in the drive ring at one end via a connection pin and is connected to the nozzle vane at another end;
    a press-fitting pin which has a flange portion facing one side face of the drive ring, the press-fitting pin being press-fitted into a press-fitting hole formed in one end face of the guide part along a thrust direction of the guide part so as to retain the drive ring in the thrust direction,
    the guide part being configured to support an inner peripheral surface of the drive ring and having a width in a thrust direction which is smaller than a width of the drive ring; and
    a spacer member arranged between the flange portion of the press-fitting pin and the one end face of the guide part,
    wherein the spacer member is formed so as not to project beyond the outer peripheral surface of the guide part in a radial direction when the press-fitting pin is press-fitted, and
    wherein a thrust-directional thickness of the spacer member is formed so that a clearance is maintained between the flange portion of the press-fitting pin and one side face of the nozzle mount to prevent a fixation of the nozzle mount and a sliding portion of the driving ring, the drive ring being sandwiched between the flange portion and the side face of the nozzle mount.

2. The variable displacement exhaust turbocharger equipped with a variable nozzle mechanism according to claim 1,
    wherein the press-fitting pin includes the spacer member, and
    wherein the spacer member is formed integrally with the flange portion of the press-fitting pin.

3. The variable displacement exhaust turbocharger equipped with a variable nozzle mechanism according to claim 1,
    wherein the spacer member has an annular shape and is formed by a separate member from the press-fitting pin.

* * * * *